US012536220B2

(12) United States Patent
Venkataraman et al.

(10) Patent No.: US 12,536,220 B2
(45) Date of Patent: Jan. 27, 2026

(54) SYSTEMS AND METHODS FOR SEARCHING FOR A MEDIA ASSET

(71) Applicant: Adeia Guides Inc., San Jose, CA (US)

(72) Inventors: Sashikumar Venkataraman, Andover, MA (US); Ahmed Nizam Mohaideen Pathurudeen, Kovilpatti (IN)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 18/514,166

(22) Filed: Nov. 20, 2023

(65) Prior Publication Data

US 2024/0160657 A1 May 16, 2024

Related U.S. Application Data

(63) Continuation of application No. 17/688,077, filed on Mar. 7, 2022, now Pat. No. 11,860,927, which is a
(Continued)

(51) Int. Cl.
*G06F 16/48* (2019.01)
*G06F 16/43* (2019.01)
*G06F 16/432* (2019.01)
*G06F 16/732* (2019.01)
*G06F 16/735* (2019.01)
(Continued)

(52) U.S. Cl.
CPC .............. *G06F 16/48* (2019.01); *G06F 16/43* (2019.01); *G06F 16/433* (2019.01); *G06F 16/732* (2019.01); *G06F 16/735* (2019.01); *G06F 16/7867* (2019.01); *G06F 16/9535* (2019.01); *G06F 16/9538* (2019.01); *H04N 21/42203* (2013.01); *H04N 21/4828* (2013.01);
(Continued)

(58) Field of Classification Search
None
See application file for complete search history.

(56) References Cited

U.S. PATENT DOCUMENTS 4,980,918 A 12/1990 Bahl et al.
6,236,968 B1 5/2001 Kanevsky et al.
(Continued)

FOREIGN PATENT DOCUMENTS

EP 0954856 B1 4/2003
WO 2009105639 A1 8/2009
(Continued)

*Primary Examiner* — Yu Zhao
(74) *Attorney, Agent, or Firm* — HALEY GUILIANO LLP

(57) ABSTRACT

Systems and methods for searching for a media asset are described. In some aspects, the system includes control circuitry that receives a first search query from a user. The control circuitry identifies media assets related to the first search query from a content database. The control circuitry receives a second search query following the first search query. The control circuitry determines whether a media asset from the media assets is related to the second search query. In response to determining that less than a threshold number of media assets from the media assets are related to the second search query, the control circuitry transmits an instruction requesting the user to repeat the second search query. The control circuitry receives a third search query related to the first search query. The control circuitry determines a media asset from the media assets that is related to the third search query.

20 Claims, 8 Drawing Sheets

Related U.S. Application Data continuation of application No. 16/942,233, filed on Jul. 29, 2020, now Pat. No. 11,301,507, which is a continuation of application No. 15/823,504, filed on Nov. 27, 2017, now Pat. No. 10,762,123, which is a continuation of application No. 14/501,504, filed on Sep. 30, 2014, now Pat. No. 9,830,321.

(51) Int. Cl.
*G06F 16/78* (2019.01)
*G06F 16/9535* (2019.01)
*G06F 16/9538* (2019.01)
*H04N 21/422* (2011.01)
*H04N 21/482* (2011.01)
*G10L 15/00* (2013.01)
*G10L 15/22* (2006.01)
*G10L 15/26* (2006.01)

(52) U.S. Cl.
CPC .............. *G10L 15/00* (2013.01); *G10L 15/22* (2013.01); *G10L 15/26* (2013.01)

(56) References Cited

U.S. PATENT DOCUMENTS

| | | | |
|---|---|---|---|
| 6,370,503 B1 | 4/2002 | Ortega et al. | |
| 7,472,119 B2 * | 12/2008 | Dai | G06F 16/9535 |
| | | | 707/999.005 |
| 7,693,720 B2 | 4/2010 | Kennewick et al. | |
| 7,729,913 B1 | 6/2010 | Lee et al. | |
| 7,818,179 B2 | 10/2010 | Krasikov et al. | |
| 8,521,531 B1 | 8/2013 | Kim | |
| 8,606,577 B1 | 12/2013 | Stewart et al. | |
| 9,342,598 B1 * | 5/2016 | Maeng | G06F 16/3349 |
| 2002/0184085 A1 * | 12/2002 | Lindia | G06Q 10/06398 |
| | | | 705/7.42 |
| 2003/0069731 A1 * | 4/2003 | Foucher | H04M 3/493 |
| | | | 704/251 |
| 2007/0106685 A1 | 5/2007 | Houh et al. | |
| 2007/0143307 A1 | 6/2007 | Bowers et al. | |
| 2007/0276801 A1 | 11/2007 | Lawrence et al. | |
| 2008/0077558 A1 | 3/2008 | Lawrence et al. | |
| 2008/0222140 A1 * | 9/2008 | Lagad | G06F 16/951 |
| | | | 707/999.005 |
| 2009/0080343 A1 | 3/2009 | Simmons et al. | |
| 2009/0089251 A1 | 4/2009 | Johnston et al. | |
| 2010/0105370 A1 | 4/2010 | Kruzeniski et al. | |
| 2010/0153112 A1 | 6/2010 | Phillips et al. | |
| 2011/0071827 A1 | 3/2011 | Lee et al. | |
| 2011/0270818 A1 | 11/2011 | Chowdhury et al. | |
| 2012/0060113 A1 | 3/2012 | Sejnoha et al. | |
| 2012/0084079 A1 | 4/2012 | Gruenstein et al. | |
| 2012/0096030 A1 | 4/2012 | Kim | |
| 2012/0096042 A1 | 4/2012 | Brockett et al. | |
| 2013/0054245 A1 * | 2/2013 | Chang | H04M 3/493 |
| | | | 704/270.1 |
| 2013/0262124 A1 | 10/2013 | Ponting | |
| 2014/0012582 A1 | 1/2014 | Ganong et al. | |
| 2014/0074466 A1 * | 3/2014 | Sharifi | G10L 15/1815 |
| | | | 704/235 |
| 2014/0122069 A1 | 5/2014 | Bravin et al. | |
| 2014/0136197 A1 | 5/2014 | Mamou et al. | |
| 2014/0236570 A1 | 8/2014 | Heck et al. | |
| 2014/0236572 A1 | 8/2014 | Meshulam et al. | |
| 2014/0244263 A1 | 8/2014 | Pontual et al. | |
| 2015/0052168 A1 | 2/2015 | Sharifi | |
| 2015/0332670 A1 * | 11/2015 | Akbacak | G10L 15/18 |
| | | | 704/9 |
| 2016/0092434 A1 | 3/2016 | Bellegarda | |
| 2016/0360279 A1 | 12/2016 | Batmanglidj et al. | |
| 2019/0124159 A1 | 4/2019 | Alsina et al. | |
| 2022/0358155 A1 | 11/2022 | Venkataraman et al. | |

FOREIGN PATENT DOCUMENTS

| | | |
|---|---|---|
| WO | 2012117646 A1 | 9/2012 |
| WO | 2014028797 A1 | 2/2014 |
| WO | 2016053845 A1 | 4/2016 |

* cited by examiner

SYSTEMS AND METHODS FOR SEARCHING FOR A MEDIA ASSET

CROSS-REFERENCE TO RELATED APPLICATIONS

This application is a continuation of U.S. patent application Ser. No. 17/688,077, filed Mar. 7, 2022, which is continuation of U.S. patent application Ser. No. 16/942,233, filed Jul. 29, 2020, now U.S. Pat. No. 11,301,507, which is a continuation of U.S. patent application Ser. No. 15/823,504, filed Nov. 27, 2017, now U.S. Pat. No. 10,762,123, which is a continuation of U.S. patent application Ser. No. 14/501,504, filed Sep. 30, 2014, now U.S. Pat. No. 9,830,321, the disclosures of which are hereby incorporated by reference herein in their entireties.

BACKGROUND

Interactive media systems may receive and process text information from an automatic speech recognition (ASR) module and retrieve information along with an appropriate response for the user's query. Such systems may also allow the user to retrieve information using a dialogue rather than a single transaction. However, whenever the ASR module misinterprets the user's speech, current interactive media systems tend to retrieve incorrect information since they do not know that the current query has an ASR error. Furthermore, since the user does not know when and where the ASR error occurred, he would need to repeat the entire dialogue, possibly multiple times, to get the correct information.

SUMMARY

Systems and methods are described herein for searching for a media asset. In some aspects, the systems and methods provide for an ASR module for receiving user queries in the form of dialogue. To enable such dialogues, such systems and methods store the context of the user's earlier queries, e.g., intent and entities, and use them appropriately for interpreting the user's future queries. For example, if a future query references intent and/or entities from an earlier query, then the systems and methods may automatically use the contextual information to interpret the future query. If the future query is unrelated to the earlier queries, then the system may switch the context and update the new contextual information.

In some embodiments, the systems and methods proactively predict if there was a potential speech to text translation problem, i.e., ASR error, by analyzing the user query and search results along with the current contextual information. If a problem is predicted, instead of showing irrelevant results for the query with the ASR error, the systems and methods convey the ASR error to the user in a suitable response so that the user knows that the interactive media system is aware of the ASR error. The systems and methods also store the contextual information that was present prior to the query in a mapping such as a knowledge graph, a hash table, or another suitable data structure. The mapping may connect context identifiers related to the queries in a knowledge graph. The user can then continue the dialogue-style query by just repeating or rephrasing the last query in the dialogue.

For example, the interactive media system may receive speech to text input including "show me some tom cruise movies." The interactive media system analyzes the text query, interprets the user intended to search for movies with entity "Tom Cruise," and retrieves search results accordingly with a message "I got some tom cruise movies for you." The interactive media system may subsequently receive another speech to text input including "I want the ones with kit man." The interactive media system analyzes the text query, interprets the user intended to search within the previous results for entity "kit man," and attempt to retrieve a subset accordingly. The interactive media system may find a weak classification score for entity "kit man" or may not be able to classify it at all. Alternatively, the interactive media system may find few to no relevant search results matching the subsequent search query. In either case, the interactive media system stores the earlier context and predicts a potential ASR error and returns a message to the user, "possible speech to text problem. could you please repeat the query?" The interactive media system may subsequently receive another speech to text input including "I meant kidman." The interactive media system may retrieve the earlier context of search results with movies for entity "Tom Cruise." The interactive media system may retrieve a subset corresponding to entity "kidman" along with message, "I got the following movies with Tom Cruise and Nicole Kidman."

In the preceding example, the interactive media system correctly predicted there was an ASR error with text input "kit man." For each user query, the interactive media system may analyze one or more of the entities and/or intent of the query, the search results, and contextual information to predict if there was an ASR problem in the user query. The interactive media system may use one or more heuristics to predict a potential ASR problem including a weak classification score of the entities and/or intent in the query and a low relevance among search results after evaluating the user query.

In the preceding example, the interactive media system generated a suitable error message and also stored the context of search results with movies for entity "Tom Cruise." If a potential ASR error is predicted in the user query, the interactive media system may maintain the earlier context and choose not to switch context to the user query. The interactive media system may generate a response to indicate to the user that a potential ASR error took place.

In the preceding example, the user only needed to repeat the query that had the error and continue the dialogue with the correct query "kidman." Since the user knows that the interactive media system is aware of the ASR error, he may ignore the query with the ASR error and continue the dialogue without having to repeat the contextual information from earlier queries. Based on the context stored, the interactive media system may interpret and answer the new queries despite the intermediate query that contained the ASR error.

In some embodiments, the systems and methods resolve ambiguous queries that have multiple interpretations for the user query involved. The interactive media system may store possible entities and interpretations of the query in the background but present only the most probable entity/interpretation to the user. If the user is not satisfied with the result, the interactive media system may allow the user to provide additional clues without repeating the earlier query. The interactive media system may use the additional clues provided by the user to narrow down the results among the interpretations and entities that were stored for the earlier query.

For example, the interactive media system may receive speech to text input including "beethoven movie." The interactive media system analyzes the text query, interprets the user intended to search for movies with entity "beethoven," and retrieves search results accordingly with a message "here is a Ludwig Van Beethoven movie." The interactive media system may store the context for this search in a mapping such as a knowledge graph, a hash table, or another suitable data structure. The mapping may connect context identifiers related to the queries in a knowledge graph. The interactive media system may receive a subsequent user query including text input "I meant the dog." The interactive media system may retrieve the earlier context for the "beethoven movies" search results. The interactive media system analyzes the subsequent query, interprets the user intended to search for movies with entity "beethoven the dog," and retrieves search results accordingly with a message "I got beethoven the dog movies."

In another example, the interactive media system may receive speech to text input including "when are bruins playing?" The interactive media system analyzes the text query, interprets the user intended to search for sports programs with entity "Boston Bruins," and retrieves search results accordingly with a message "Boston Bruins are playing tomorrow night 9 pm." The interactive media system may store the context for this search in a mapping such as a knowledge graph, a hash table, or another suitable data structure. The mapping may connect context identifiers related to the queries in a knowledge graph. The interactive media system may receive a subsequent user query including text input "I meant college football." The interactive media system may retrieve the earlier context for the "Boston Bruins" search results. The interactive media system analyzes the subsequent query, interprets the user intended to search for sports programs with entity "UCLA Bruins," and retrieves search results accordingly with a message "Oh. You meant the UCLA bruins. They play tomorrow at 8 pm."

As described earlier, the interactive media system may store possible entities and interpretations of the query in the background but present only the most probable entity/interpretation to the user. If the user is not satisfied with the result, the interactive media system may allow the user to provide additional clues without repeating the earlier query. The interactive media system may use the additional clues provided by the user to narrow down the results among the interpretations and entities that were stored for the earlier query. The narrowing down of the search results may be based on one or more heuristics including popularity of entities (e.g., more popular entities are more likely interpretations), temporal relevance (e.g., sports teams which are playing in current time as opposed to off-season teams), and connections between the entities corresponding to different terms in the query (e.g., in user query "tom cruise kidman," "kidman" most probably refers to "Nicole Kidman" due to connection to "Tom Cruise" via common movies.

In some embodiments, the interactive media system stores the other entities/interpretations in the background in a dropped list. If the user query indicates that he wants some other interpretation, e.g., based on specific constructs like "I meant," and additionally provides clues, the interactive media system searches within the dropped list and checks if any result matches the additional clues. The clues may include one or more of types of intended result (e.g., I meant the musician"), concept related to the intended result (e.g., "college football" related to "UCLA Bruins"), and keyword related to the intended result (e.g., keyword "dog" related to "Beethoven the dog").

In some embodiments, the systems and methods receive input from a user that identifies a speech to text translation problem, i.e., ASR error, and execute a corrected query using the stored contextual information. The systems and methods store the contextual information that was present prior to the query in a mapping such as a knowledge graph, a hash table, or another suitable data structure. The mapping may connect context identifiers related to the queries in a knowledge graph. The user can then continue the dialogue-style query by just repeating or rephrasing the last query in the dialogue.

For example, the interactive media system may receive speech to text input including "show me some james bonds movies." The interactive media system analyzes the text query, interprets the user intended to search for movies with entity "James Bond," and retrieves search results accordingly with a message "I got some james bond movies for you." The interactive media system may subsequently receive another speech to text input including "how about older ones." The interactive media system analyzes the text query, mistakenly interprets that the user intended to search within the previous results for entity "golden ones," and attempts to retrieve a subset accordingly. In this case, the interactive media system may find an acceptable classification score for entity "golden ones" and retrieve search results accordingly, e.g., "GoldenEye." Because the interactive media system was able to retrieve search results for the mistakenly interpreted query, the interactive media system may not detect the ASR error. However, the user may identify the ASR error and enter another speech to text input including "no I said older ones." The interactive media system analyzes the text query and may detect that there was an ASR error in the last query which the user has identified. The interactive media system may retrieve the earlier context of search results with movies for entity "James Bond." The interactive media system may retrieve a subset corresponding to entity "older ones" along with message, "I got the following movies with James Bond that are older ones."

In some aspects, the systems and methods described herein provide for a system for searching for a media asset. The system includes control circuitry that receives a first search query from a user. The control circuitry identifies media assets related to the first search query from a content database. The control circuitry receives a second search query following the first search query. The control circuitry determines whether a media asset from the media assets is related to the second search query. In response to determining that less than a threshold number of media assets from the media assets are related to the second search query, the control circuitry transmits an instruction requesting the user to repeat the second search query. The control circuitry receives a third search query related to the first search query. The control circuitry determines a media asset from the media assets that is related to the third search query.

In some embodiments, the control circuitry determines whether a media asset from the plurality of media assets is related to the second search query by determining whether a context identifier for the second search query exists in a mapping of context identifiers including a first context identifier for the first search query.

In some embodiments, the third search query being related to the first search query comprises a first context identifier for the first search query and a second context identifier for the third search query being connected in a mapping of context identifiers.

In some embodiments, the mapping of context identifiers that connects the first context identifier with the second context identifier is part of a knowledge graph.

In some embodiments, the mapping of context identifiers that connects the first context identifier and the third context identifier is stored in a user profile of the user.

In some embodiments, the first context identifier and the second context identifier are selected from at least one of a genre, an actor, and a start time of a media asset.

In some embodiments, the first context identifier is substantially similar to the first search query and the second context identifier is substantially similar to the third search query.

In some embodiments, the instruction requesting the user to repeat the second search query includes an error message indicating that less than a threshold number of media assets relate to both the first search query and the second search query.

In some embodiments, the instruction requesting the user to repeat the second search query includes a media asset from the content database relating to the second search query but not relating to the first search query.

In some embodiments, at least one of the first search query, the second search query, and the third search query is received from an automated speech to text system.

In some aspects, the systems and methods described herein include a method, an apparatus, or non-transitory machine-readable media for searching for a media asset configured to execute the functionality described above.

It should be noted, the systems and/or methods described above may be applied to, or used in accordance with, other systems, methods and/or apparatuses.

BRIEF DESCRIPTION OF THE DRAWINGS

The above and other objects and advantages of the disclosure will be apparent under consideration of the following detailed description, taken in conjunction with the accompanying drawings, in which like reference characters refer to like parts throughout, and in which.

DESCRIPTION

Figure 1:
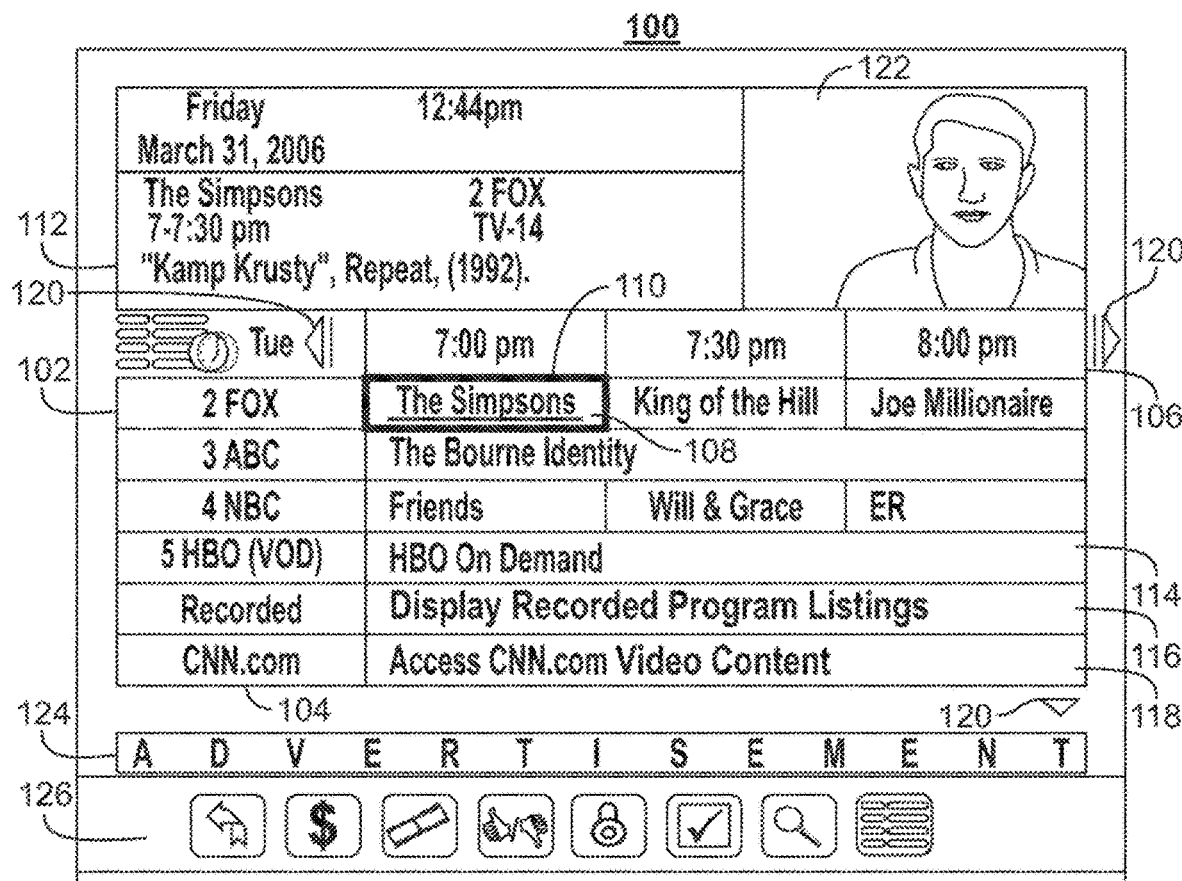
FIGS. 1 and 2 show illustrative display screens that may be used to provide media guidance application listings in accordance with some embodiments of the present disclosure.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Figure 2:
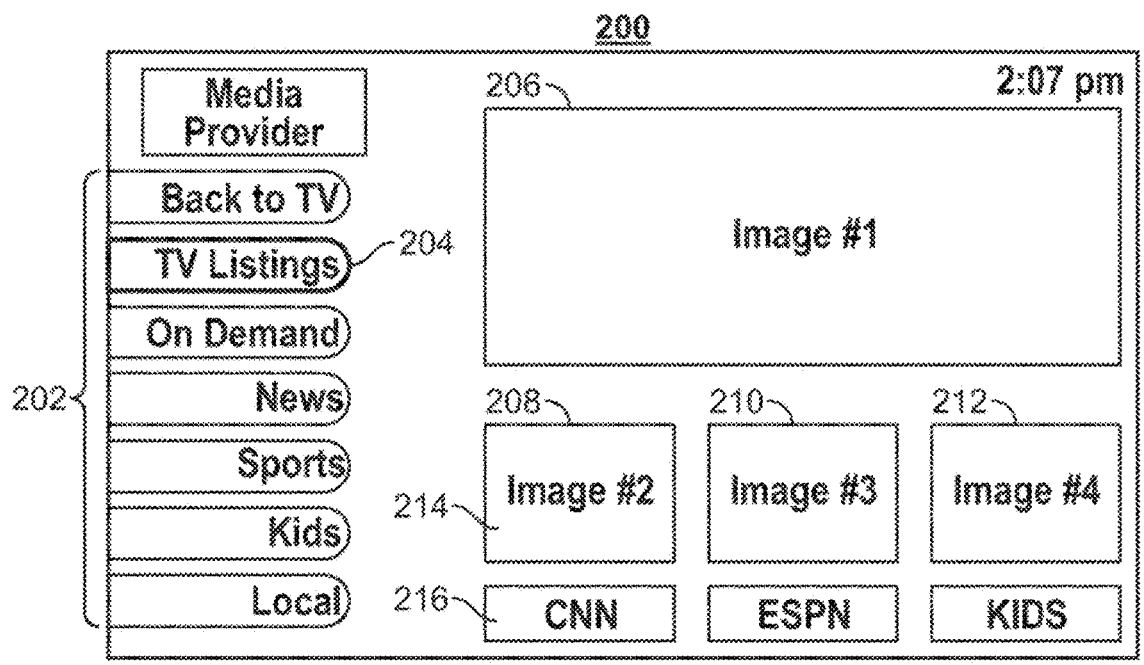

FIGS. 1-2 show illustrative display screens that may be used to provide media guidance data. The display screens shown in FIGS. 1-2 and 5-7 may be implemented on any suitable user equipment device or platform. While the displays of FIGS. 1-2 and 5-7 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 1 shows an illustrative grid of a program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In display 200, television listings option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Dec. 29, 2005, which is hereby incorporated by reference herein in its entirety.

Figure 3:
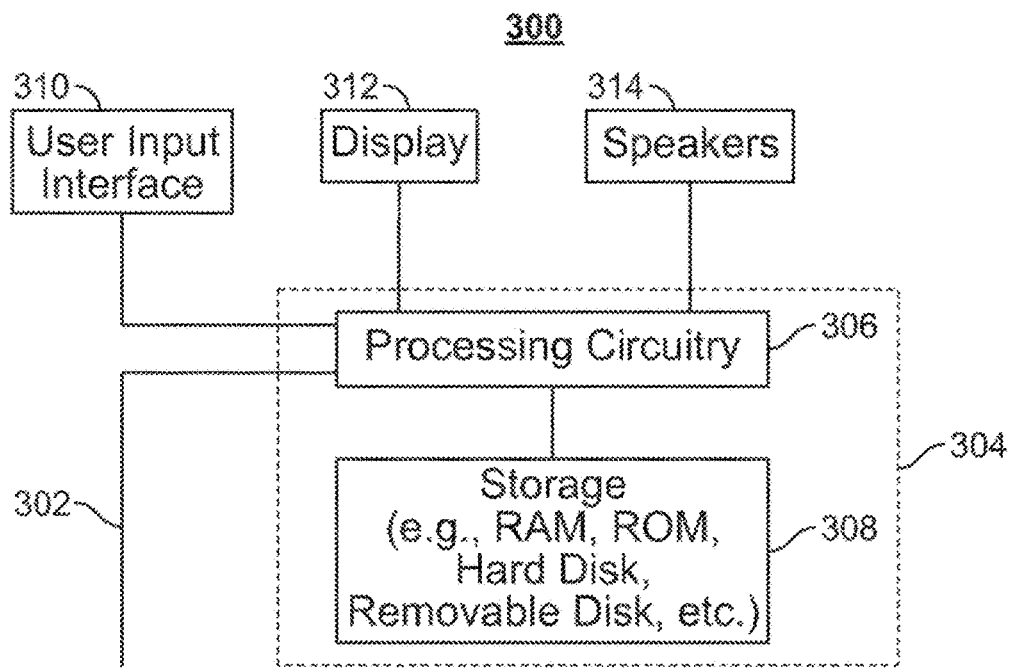
FIG. 3 shows an illustrative user equipment device in accordance with some embodiments of the disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 312 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly-implemented on user equipment device 300. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays. For example, equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
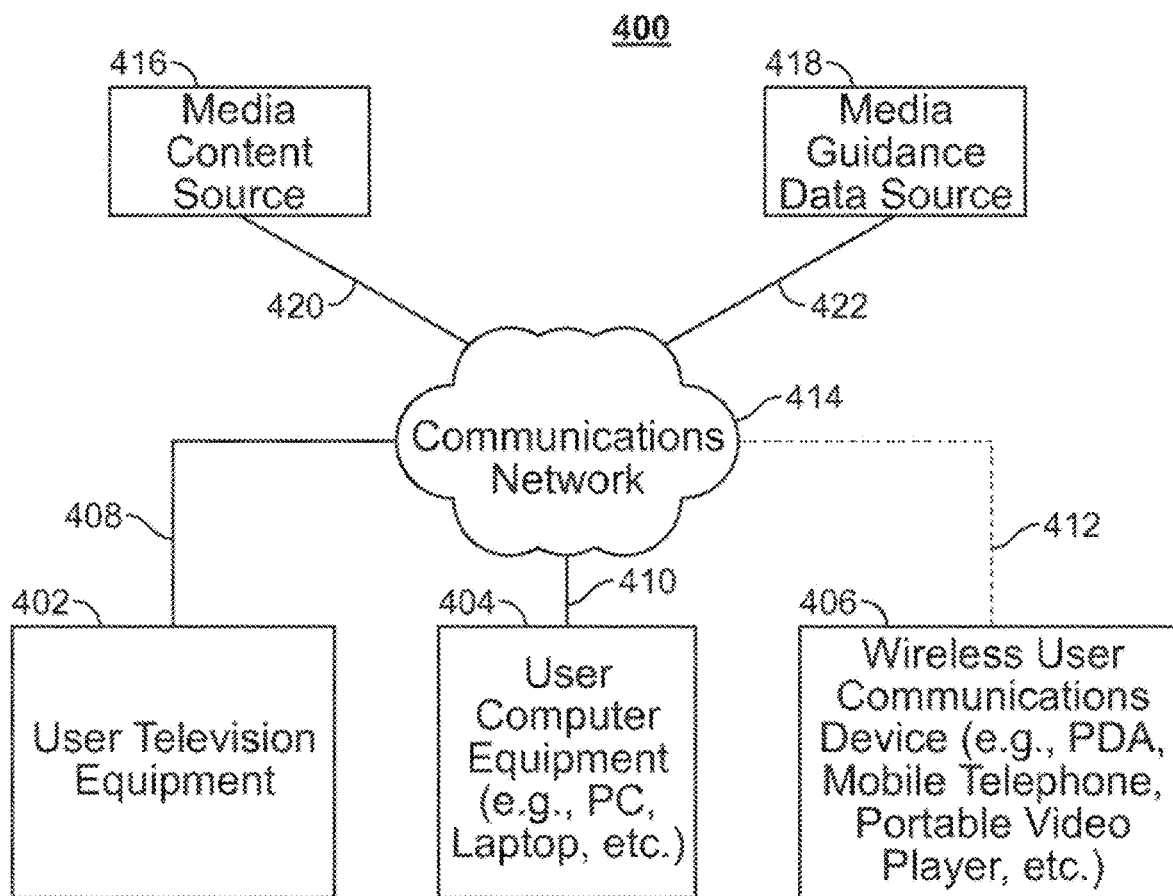
FIG. 4 is a diagram of an illustrative cross-platform interactive media system in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions and advertisements that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry 304 of the receiving user equipment to generate the guidance application displays.

In some embodiments, the server application executed by the control circuitry of the remote server may be a context classification application that determines contextual information related to searches performed by a user. The contextual information may include, but need not be limited to, search queries submitted by a user, identifiers assigned to such search queries, and metadata related to search queries. The contextual information may further include user input, submitted in response to previous searches, that confirms or rejects contextual information attributed to the previous searches by the user equipment device.

As part of determining contextual information, the remote server may communicate with one or more other entities, such as speech recognition engine 704 and search engine 708. Speech recognition engine 704 may further communicate with speech recognition database 710, and search engine 708 may further communicate with media asset database 716. The remote server, as part of executing context classification engine 706, may further communicate with knowledge graph 712 and context database 714. For example, the control circuitry of the remote server may assign a first identifier to a first search query based on information retrieved from context database 714. Control circuitry 417 may then assign a second identifier to a second search query received from the user, and determine whether the first search query and the second search query are related based on their relationship in knowledge graph 800.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

Figure 5:
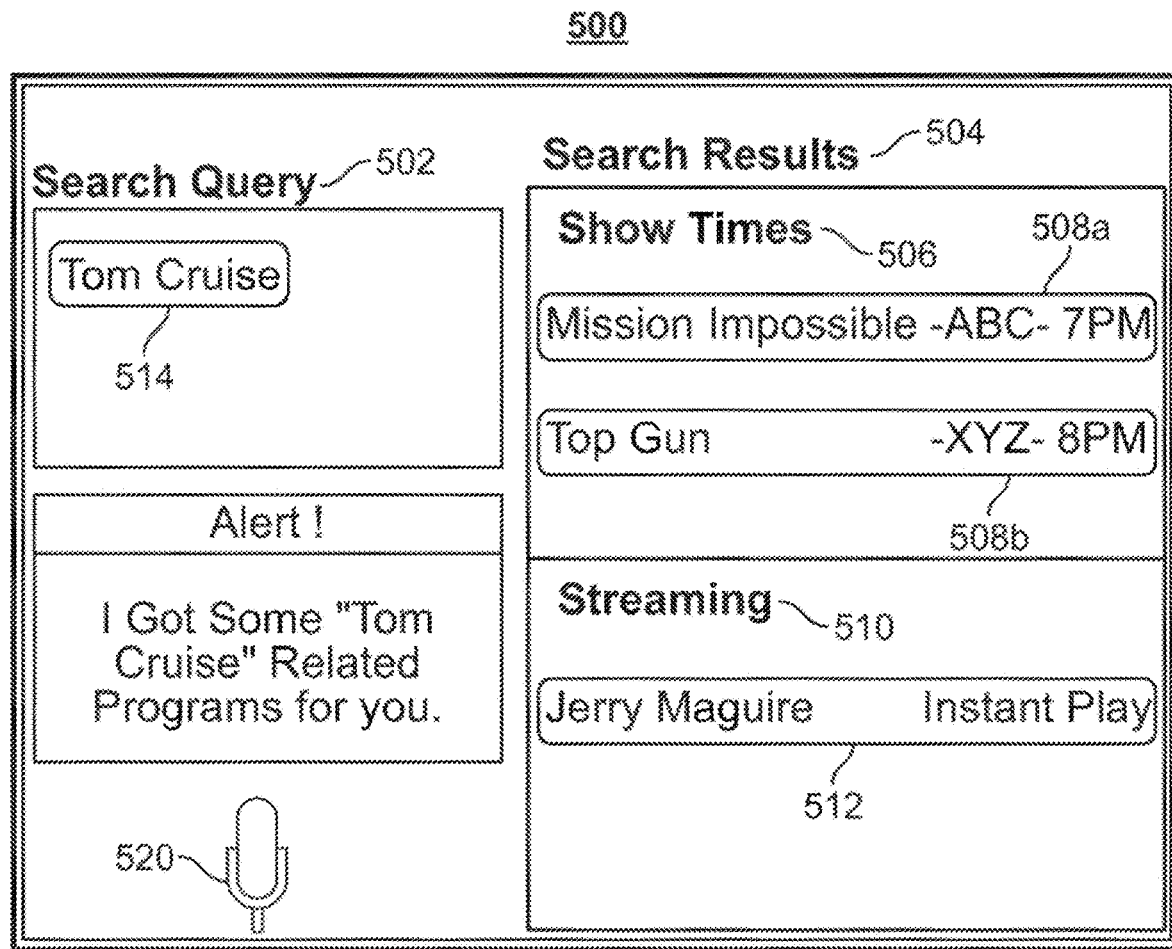
FIG. 5 shows an illustrative graphical user interface that may be used to search for a media asset, in accordance with some embodiments of the disclosure.

FIG. 5 shows an illustrative graphical user interface 500 that may be used to search for media assets, in accordance with some embodiments of the present disclosure. As discussed in relation to FIG. 3, control circuitry 304 of user equipment device 300 may generate for display on display 312 graphical user interface 500 in response to receiving a request from the user to perform a search. Graphical user interface 500 may include a search query window 502 and a search result window 504. Search result window 504 may be split into several segments, according to the type of content displayed in the window. For example, search result window 504 may contain a show times window 506, corresponding to media assets that are transmitted on broadcast channels, and a streaming window, corresponding to media assets that can be streamed from a remote server or other form of storage medium.

In some embodiments, control circuitry 304 updates graphical user interface 500 in response to receiving voice input from the user. Voice input indicator 520 may be used to facilitate the interaction between graphical user interface 500 and the user. For example, control circuitry 304 may generate for display voice input indicator 520 to alert the user that voice commands may be used as input. Control circuitry 304 may then receive a command that indicates that a voice command is about to be issued by the user, for example, by pressing a button on a remote control, touching the screen at a substantially similar position as voice input indicator 520, or by using other suitable means. The input may also correspond to a control command spoken by a user, such as "Command" or a similar input. Upon receiving such user input, control circuitry 304 may receive voice data that is processed using automatic speech recognition techniques and translated to text format, such as a text string, that can be more easily processed further by control circuitry 304.

In some embodiments, control circuitry 304 may receive a search command from the user that includes a first search query. In response to receiving the search command, control circuitry 304 may cause graphical user interface 500 to display a search query window 502 that includes a textual representation of the search query (e.g., search query 514, a search for media assets starring the actor "Tom Cruise"). Control circuitry 304 may abbreviate the search query in order to present it to the user in more compact form, such as by displaying the text "Tom Cruise" instead of "show me some tom cruise movies" or a similar form of search query.

In some embodiments, control circuitry 304 may perform a search for media assets that match search query 514 received from the user. Various types of media assets, such as broadcast programs or media assets available on-demand, may be searched and displayed in search results window 504 of graphical user interface 500. Media assets that are identified by control circuitry 304 as matching search query 502 may also be grouped according to their type, such as by showing broadcast programs 508a and 508b in show time segment 506 and media assets that are available on-demand 512 in streaming segment 510. Although not shown in FIG. 5 to avoid overcomplicating the drawing, control circuitry 304 may generate for display additional media type segments, such as for media assets stored locally on a hard disk, or other suitable types of media assets. In some aspects, control circuitry 304 may automatically perform a search as soon as search query 514 is received from the user. In other embodiments, control circuitry 304 may not perform a search for media assets matching search query 514 until an explicit search command is received from the user.

Figure 6:
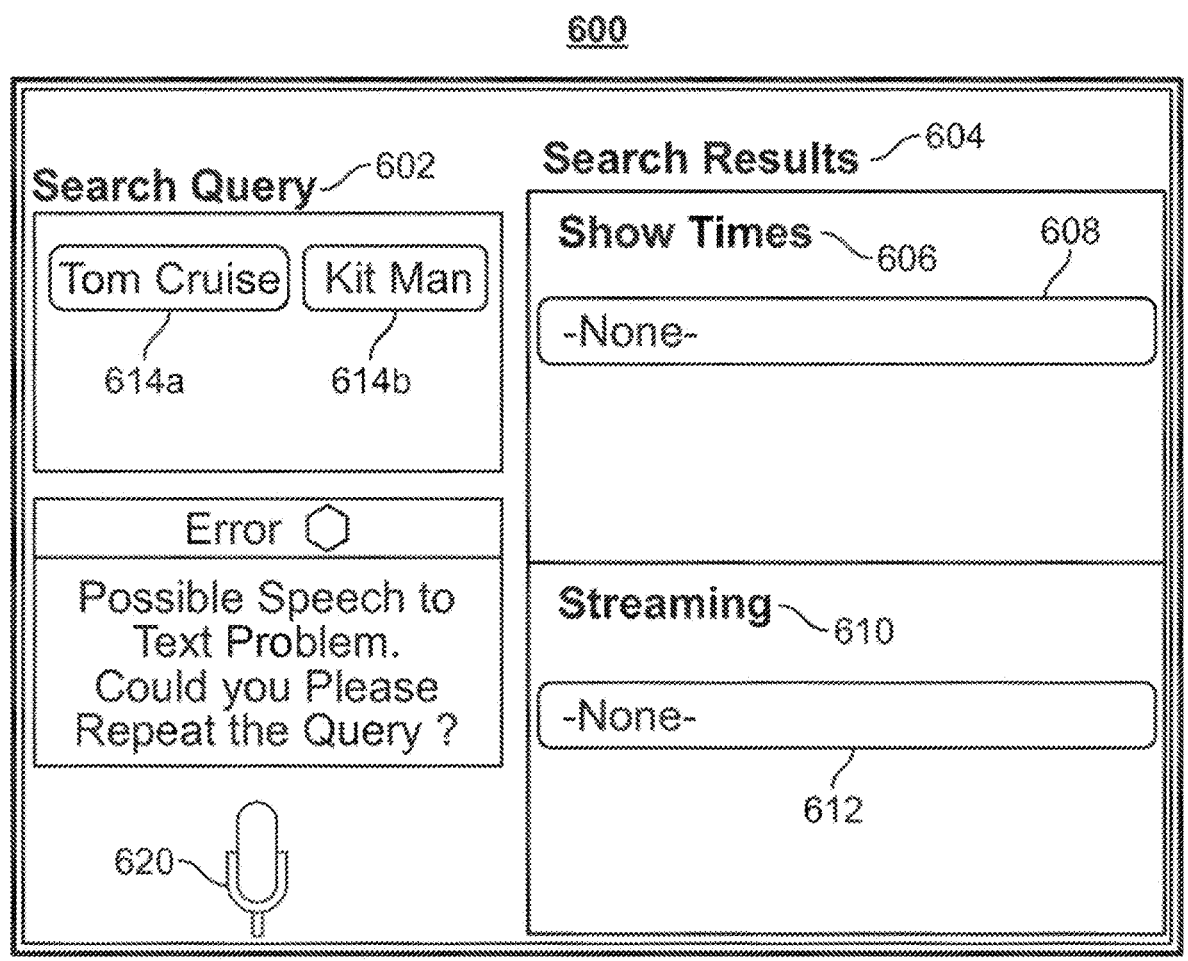
FIG. 6 shows another illustrative graphical user interface that may be used to search for a media asset, in accordance with some embodiments of the disclosure.

FIG. 6 shows another illustrative graphical user interface 600 that may be used to search for media assets, in accordance with some embodiments of the present disclosure. Voice input indicator 520 may be used to facilitate the interaction between graphical user interface 600 and the user. For example, control circuitry 304 may generate for display voice input indicator 620 to alert the user that voice commands may be used as input. Subsequent to receiving search query 514 (indicated as query 614a) and possibly performing a search based on search query 514, control circuitry 304 may receive a second search query 614b from the user. For example, search query 614b may correspond to a subset of the media assets related to the first query, such as a subset related to "kit man." Similar to the processing performed by control circuitry 304 in relation to search query 514, search query 614b may be shown in textual form as part of graphical user interface 600. Control circuitry 304 proactively predicts if there was a potential speech to text translation problem, i.e., ASR error, by analyzing the second query and search results along with the current contextual information. Control circuitry 304 also stores the contextual information that was present prior to the query in a mapping such as knowledge graph 800 described with respect FIG. 8. The mapping may connect context identifiers related to the queries in a knowledge graph.

Control circuitry 304 may compute a weak classification score for entity "kit man" or may not be able to classify it at all. Alternatively, control circuitry 304 may find few to no relevant search results matching the subsequent search query. As shown in FIG. 6, control circuitry 304 found no relevant search results matching the subsequent search query. Various types of media assets, such as broadcast programs or media assets available on-demand, may be searched and displayed in search results window 604 of graphical user interface 600. Media assets that are identified by control circuitry 304 as matching search query 602 may also be grouped according to their type, such as by showing broadcast programs 608 in show time segment 606 and media assets that are available on-demand 612 in streaming segment 610. Control circuitry 304 stores the earlier context in knowledge graph 800 and returns a potential ASR error message to the user, "possible speech to text problem. could you please repeat the query?"

Figure 7:
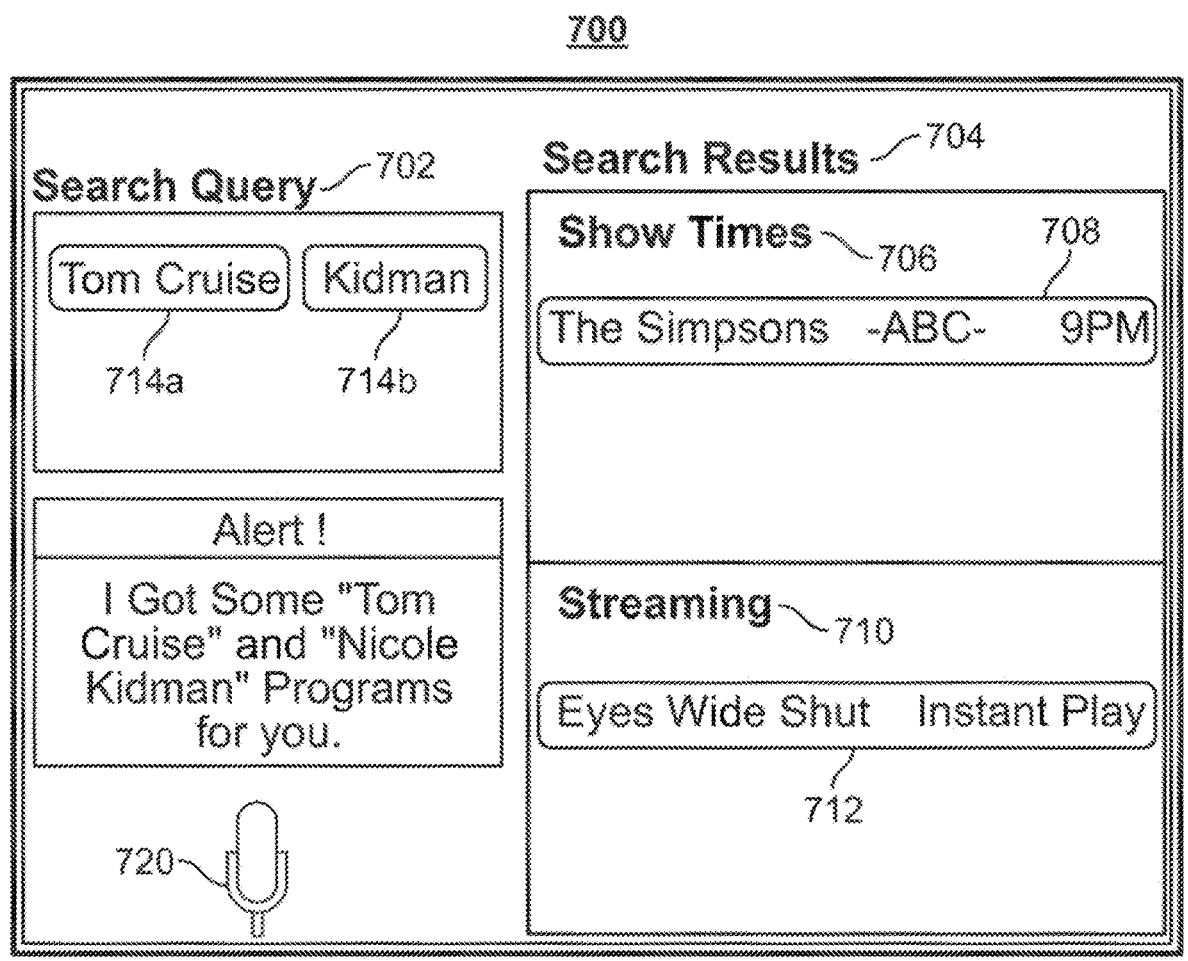
FIG. 7 shows yet another illustrative graphical user interface that may be used to search for a media asset, in accordance with some embodiments of the disclosure.

FIG. 7 shows another illustrative graphical user interface 700 that may be used to search for media assets, in accordance with some embodiments of the present disclosure. Voice input indicator 520 may be used to facilitate the interaction between graphical user interface 700 and the user. For example, control circuitry 304 may generate for display voice input indicator 720 to alert the user that voice commands may be used as input. Subsequent to receiving search query 514 (indicated as query 714a) and query 614b (indicated as query 714b) and possibly performing a search based on search query 614b, control circuitry 304 returns a potential ASR error message to the user, "possible speech to text problem. could you please repeat the query?" Control circuitry 304 subsequently receives another query 714b in the form of speech to text input including "I meant kidman." Control circuitry 304 may retrieve the earlier context of search results with movies for entity "Tom Cruise" from knowledge graph 800. Control circuitry 304 may retrieve a subset of search results 704 corresponding to entity "kidman" along with a message, "I got the following movies with Tom Cruise and Nicole Kidman." Various types of media assets, such as broadcast programs or media assets available on-demand, may be searched and displayed in search results window 704 of graphical user interface 700. Media assets that are identified by control circuitry 304 as matching search query 702 may also be grouped according to their type, such as by showing broadcast programs 708 in show time segment 706 and media assets that are available on-demand 712 in streaming segment 710.

In the example shown in FIGS. 5-7, control circuitry 304 correctly predicted there was an ASR error with text input "kit man." For each user query, control circuitry 304 may analyze one or more of the entities and/or intent of the query, the search results, and contextual information from knowledge graph 800 to predict if there was an ASR problem in the user query. Control circuitry 304 may use one or more heuristics to predict a potential ASR problem including a weak classification score of the entities and/or intent in the query and a low relevance among search results after evaluating the user query.

In the example shown in FIGS. 5-7, control circuitry 304 generated a suitable error message and also stored the context of search results with movies for entity "Tom Cruise." If a potential ASR error is predicted in the user query, control circuitry 304 may maintain the earlier context in knowledge graph 800 and choose not to switch context to the user query. The system may generate a response to indicate to the user that a potential ASR error took place.

In the example shown in FIGS. 5-7, the user only needed to repeat the query that had the error and continue the dialogue with the correct query "kidman." Since the user knows that the interactive media system is aware of the ASR error, he may ignore the query with the ASR error and continue the dialogue without having to repeat the contextual information from earlier queries. Based on the context stored, control circuitry 304 may interpret and answer the new queries despite the intermediate query that contained the ASR error.

Figure 8:
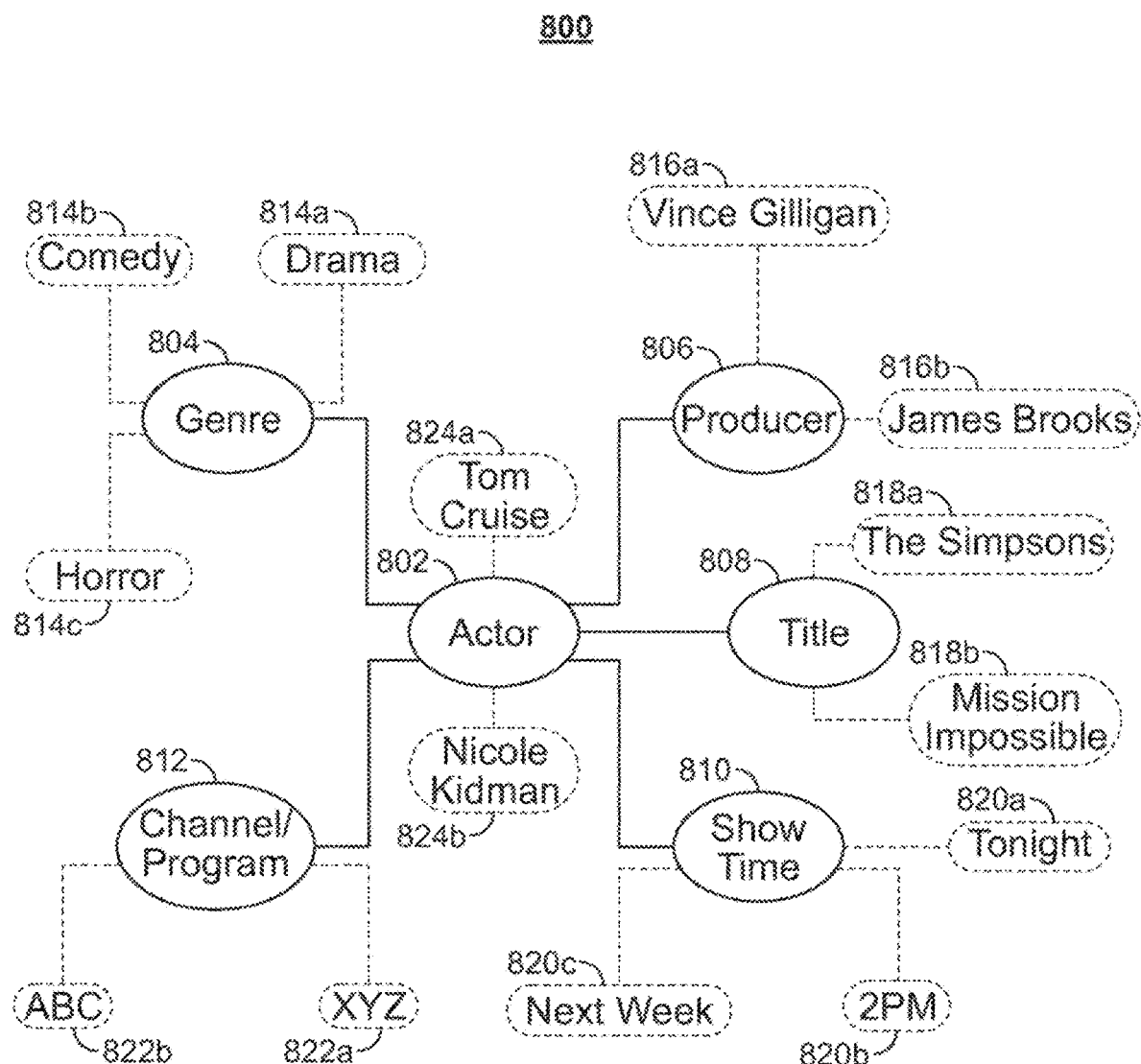
FIG. 8 shows a knowledge graph that illustrates contextual information used for searching for media assets, in accordance with some embodiments of the disclosure.

FIG. 8 shows a knowledge graph 800 that represents contextual information used for searching for a media asset, in accordance with some embodiments of the disclosure. Knowledge graph 800 may include a possibly large number of entities that are represented as nodes in the graph. For example, knowledge graph 800 may contain, among others, nodes 802, 804, 806, 808, 810, and 812. The nodes of knowledge graph 800 may be connected by edges, and the presence of an edge in the graph may represent that there is an association between the entities represented by the nodes in the graph. For example, the edge connecting node 802 (i.e., "actor") with node 808 (i.e., "title") may illustrate the availability of contextual information between a media asset's title and actors featured in the media asset. In some implementations, an edge in knowledge graph 800 denotes that an association between the two entities connected by the edge is present. Conversely, the absence of an edge in knowledge graph 800 between two entities may denote that no association exists. For example, nodes 802 and 804 may be connected by an edge, illustrating possible search results when a search query related to a genre of a media asset is followed by a subsequent search query related to an actor being featured in the media asset. For example, control circuitry 304 may determine, based on the presence of an edge between nodes 802 and 804, possible search results for a search query related to a genre of a media asset, e.g., "Drama" followed by a subsequent search query related to an actor being featured in the media asset, e.g., "Tom Cruise."

In some aspects, knowledge graph 800 may include nodes of various degrees. For example, knowledge graph 800 may include nodes of a first degree, such as nodes 802-812, and nodes of a second degree, such as nodes 814-822. Nodes of a first degree may correspond to broad categories, such as "actor," "genre," "producer," "title," "show time," and "channel/program." Nodes of a second degree may correspond to terms with a more narrow meaning, such as specific instances that fall under the broad categories represented by the first degree nodes. For example, "actor" node 802 may be connected with node 824a ("Tom Cruise") and node 824b ("Nicole Kidman"). Node 802 may be connected with many more nodes, even though only nodes 824a and 824b are shown in FIG. 8 to avoid overcomplicating the drawing. Similarly, "title" node 808 may be connected with node 818a ("The Simpsons"), node 818b ("Mission Impossible"), and other nodes (not shown). In some embodiments, each of the second degree nodes may be connected to only a single first degree node, which may result in a structured graph that is more easily traversed by control circuitry 304 when a search needs to be performed. Alternatively, second degree nodes may be connected to more than a single first degree node, e.g., to accommodate cases in which the concept represented by the second degree may need to be associated with more than a single first degree node (e.g., a person who is both an actor and a producer).

Figure 9:
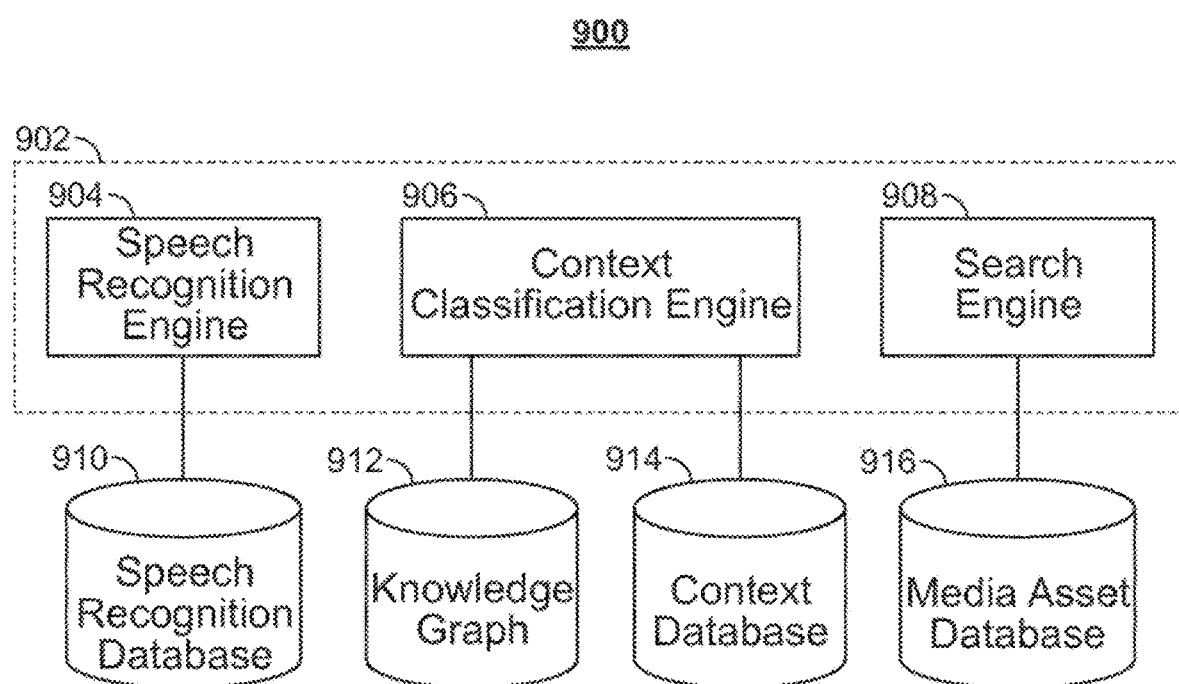
FIG. 9 is an illustrative block diagram of an interactive media system for searching for a media asset, in accordance with some embodiments of the disclosure.

FIG. 9 is an illustrative block diagram 900 of an interactive media system 900 for searching for a media asset, in accordance with some embodiments of the disclosure. Interactive media system 900 may comprise several components that are located on remote server 902. Remote server 902 may be a remote server including control circuitry as shown in relation to FIG. 4. In some embodiments, remote server 702 may host several components to perform automatic speech recognition, classify contextual information related received input, and perform a search. For example, remote server 902 may include speech recognition engine 904, context classification engine 906, and search engine 908. As referred to herein, operations performed by speech recognition engine 904, context classification engine 906, and search engine 908 should be understood to mean operations that are executed by control circuitry. For example, speech recognition engine 904 may be installed on remote server 902 or 415 as a piece of software code. The control circuitry may then execute the software corresponding to speech recognition engine 904 to carry out the functionality assigned to speech recognition engine 904 (e.g., to perform automatic speech recognition of speech input).

Speech recognition engine 904 may be an application that receives a speech segment as input (e.g., in form of an audio file or a similar digital representation) and generates a text string as output that captures the content of the speech segment. In some embodiments, speech recognition engine 904 may receive the speech segment from remote server 902, which in turn may receive the speech segment from control circuitry 304. In some embodiments, speech recognition engine 904 may be connected to speech recognition database 910 that stores the vocabulary of a language spoken by a user (e.g., English). Speech recognition database 910 may further include a vocabulary of reserved words that represent commands available to the user. For example, the word "Command" may be reserved and represent the beginning of a command that is available to the user. For example, the word "Command" followed by "Search" may indicate that the user intends to perform a search of media assets.

Context classification engine 906 may be responsible for assigning identifiers to search queries received from speech recognition engine 904. In some embodiments, context classification engine 906 may first identify keywords associated with the search queries, for example, by using context database 914. Context database 914 may contain listings of keywords that frequently occur in searches for media assets. Context database 914 may also contain rules that may be used by context classification engine 906 to extract keywords from the search queries. For example, one rule may specify when articles, such as "the" and "a" may be deleted. Another rule may specify words that should be removed because they are clear from context. For instance, the search query "media asset Tom Cruise" may be reduced to "Tom Cruise," because it may be clear from context that any search pertains to media assets.

In response to identifying keywords based on the received search query, context classification engine 906 may assign an identifier to the search query. Context classification engine 906 may select the identifier based on the search query from a predefined set of candidate identifiers. The identifiers included in the candidate set may have a varying degree of specificity. For example, in a first embodiment, the set of identifiers may only include first degree nodes in knowledge graph 800, as is discussed in relation to FIG. 8. These identifiers may include "actor," "genre," "channel/program," "title," "producer," and "show time." Other suitable identifiers that are typically included in media asset metadata may also be included. Context classification engine 906 may assign such relatively broad terms because these terms may provide appropriate contextual information based on which the search query is issued. For instance, if a user is looking for media assets that feature the actor "Tom Cruise," then the identifier "actor" may broadly capture the context within which the user has issued the search query. Similarly, if control circuitry 304 receives a command from the user to search for media assets with a start time in the evening (e.g., in response to receiving a search query "what's on this evening"), the identifier "start time" may broadly capture the context of the search.

In a second embodiment, identifiers assigned to the search query may be associated with a larger degree of specificity. For instance, the identifiers may be substantially similar to the keywords that are being extracted by control circuitry 304 from speech data provided by the user. For example, in response to receiving the search query "what's on tonight," control circuitry 304 may assign the identifier "tonight" instead of "start time." In another example, if control circuitry receives the search query "show me a movie starring Tom Cruise," control circuitry 304 may assign the identifier "Tom Cruise" rather than "actor." The larger degree of specificity associated with this second exemplary embodiment may provide more accurate contextual information, at the expense of failing to make associations that could be made in the case of using broader identifiers.

Context classification engine 906 may further be connected to knowledge graph database 912. Upon assigning an identifier to the search query received from speech recognition engine 904, context classification engine 906 may access knowledge graph database 912 to determine if a node exists in knowledge graph 800 that corresponds to the identifier. If such a node exists, context classification engine 906 may next identify other identifiers from knowledge graph database 912 that are related to the identifier, e.g., by considering all the edges that connected to the node corresponding to the identifier. Next, context classification engine 906 may perform processing for each of the related nodes determined from the knowledge graph. The further processing may include adding the current identifier to a candidate set of identifiers.

In some embodiments, upon receiving a second search query, context classification engine 906 may assign a second identifier to the second search query. Context classification engine 906 may then determine whether the second identifier is contained in the set of candidate identifiers. If context classification engine 906 determines that the second identifier is contained in the set, context classification engine 906 may determine that the first search query and the second search query are related. Alternatively, if the second identifier is not contained in the candidate set, context classification engine 906 may determine that the first search query and the second search query are not related.

Search engine 908 may be responsible for searching a plurality of media assets based on one or more search queries. In some embodiments, search engine 908 may be connected to media asset database 916 that contains media assets, metadata associated with media assets, and other information suitable for locating a media asset among the plurality of media assets based on search queries. Search engine 908 may receive a number of search queries as input, and provide a plurality of media asset listings as output. Control circuitry 304 may generate a display of the plurality of media asset listings in graphical user interface 500, as is discussed in relation to FIG. 5.

Figure 10:
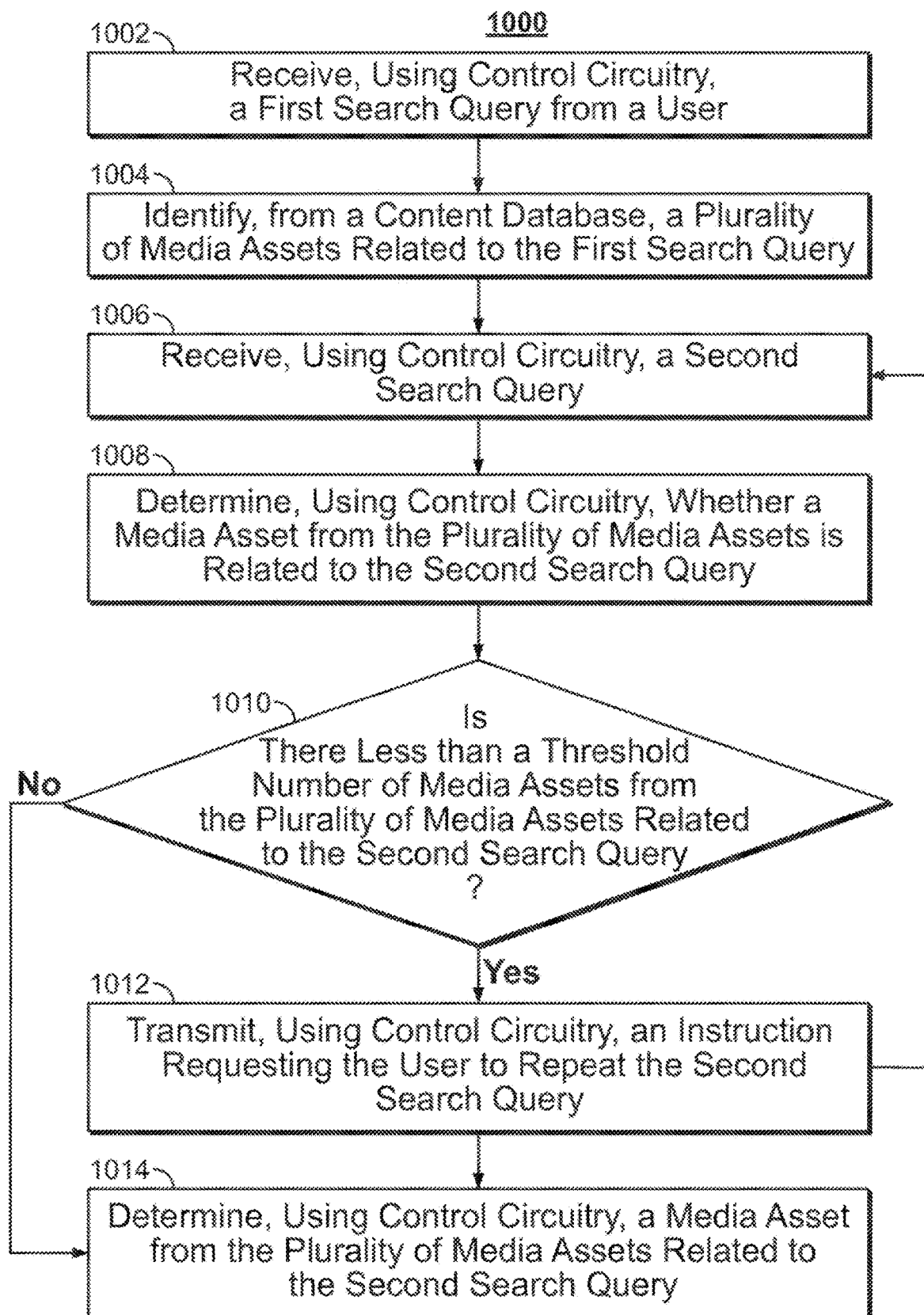
FIG. 10 shows a flow diagram of illustrative steps involved in searching for a media asset, in accordance with some embodiments of the disclosure.

FIG. 10 shows a flow diagram of a process 1000 including illustrative steps involved in searching for a media asset, in accordance with some embodiments of the present disclosure. In some embodiments, process 1000 may be performed by control circuitry 304. In other embodiments, some steps of process 1000 may be performed by a combination of control circuitry 304 and control circuitry 902, as is discussed in relation to FIG. 9. For example, speech recognition engine 904, context classification engine 906, or search engine 908 may be executed on remote server 902 and remotely accessed or controlled by control circuitry 304.

At step 1002, control circuitry 304 receives a first search query from a user, such as search query 514 discussed in relation to FIG. 5. Control circuitry 304 may receive the search query in various forms. In a first embodiment, control circuitry 304 may receive a string of text entered by the user using a keyboard, by pressing buttons on a remote control unit, by pressing buttons associated with an on-screen keyboard, or by entering text in any other suitable way. In a second embodiment, control circuitry 304 may receive voice commands from the user in the form of speech data. The speech data may contain predefined voice commands (e.g., to denote that a voice command follows) as well as unrestricted and continuous speech uttered by the user. The speech data may be accompanied by control data, such as information related to a specific button pressed by the user on a remote control before or while providing the speech input. For example, the user may press a first button on a remote control to perform a first function based on the speech data. For example, the user may press a "search" button to perform a search for media assets corresponding to a search query represented by the speech data. Alternatively, the user may press an "action" button to execute a specific function with respect to a command represented by the voice data (e.g., change channels to a broadcast channel whose name is provided in the speech data).

In some aspects, control circuitry 304 may be available to receive a search query at any time, and may continuously look for search queries among input provided to control circuitry 304 (e.g., by continuously monitoring speech input from a microphone). In other aspects, the reception of a search query may be initiated by a trigger, such as a search command being issued by the user. In this case, control circuitry may not need to monitor speech input continuously but rather may look for a search query only in response to receiving a trigger signal.

At step 1004, control circuitry 304 identifies media assets related to the received first search query from a content database, e.g., media content source 416 or media asset database 916 or any other suitable content database. At step 1006, control circuitry 304 receives a second search query from a user, such as search query 614b discussed in relation to FIG. 6. For example, search query 614b may correspond to a subset of the media assets related to the first query, such as a subset related to "kit man." For each user query, control circuitry 304 may analyze one or more of the entities and/or intent of the query, the search results, and contextual information from knowledge graph 800 to predict if there was an ASR problem in the user query. Control circuitry 304 may use one or more heuristics to predict a potential ASR problem, including a weak classification score of the entities and/or intent in the query and a low relevance among search results after evaluating the user query.

At step 1008, control circuitry 304 determines whether a media asset from the identified media assets is related to the second search query. Control circuitry 304 may compute a weak classification score for entity "kit man" or may not be able to classify it at all. Alternatively, control circuitry 304 may find few to no relevant search results matching the subsequent search query. At step 1010, control circuitry 304 checks if the number of media assets from step 1008 is less than a threshold number. The threshold number may be input by the user, set automatically by control circuitry 304, or retrieved from another suitable source. The threshold number may be used as a measure of classification of the search query, relevance of search results, or another suitable metric. For example, if the threshold number is set to five, fewer than five search results may indicate a low relevance and a possible ASR error. If the number of media assets is less than the threshold number, control circuitry 304 proceeds to step 1012 and transmits an instruction requesting the user to repeat the second search query. If a potential ASR error is predicted in the user query, control circuitry 304 may maintain the earlier context in knowledge graph 800 and choose not to switch context to the user query. The system may generate a response to indicate to the user that a potential ASR error took place. Control circuitry 304 may store the earlier context in knowledge graph 800 and return a potential ASR error message to the user, "possible speech to text problem. could you please repeat the query?" Control circuitry 304 may then return to step 1006 and await the second search query.

If the number of media assets meets or exceeds the threshold number, control circuitry 304 proceeds to step 1014 and determines a media asset related to the updated second search query (or third search query) from the media assets identified based on the first search query. Since the user knows that the interactive media system is aware of the ASR error, he may ignore the query with the ASR error and continue the dialogue without having to repeat the contextual information from earlier queries. Based on the context stored, control circuitry 304 may interpret and answer the new queries despite the intermediate query that contained the ASR error. Control circuitry 304 may subsequently receive search query 714*b* in the form of speech to text input including "I meant kidman." Control circuitry 304 may retrieve the earlier context of search results with movies for entity "Tom Cruise" from knowledge graph 800. Control circuitry 304 may retrieve a subset of search results 704 corresponding to entity "kidman" along with a message, "I got the following movies with Tom Cruise and Nicole Kidman."

It is contemplated that the steps or descriptions of FIG. 10 may be used with any other embodiment of this disclosure. In addition, the steps and descriptions described in relation to FIG. 10 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one or more of the steps in FIG. 10.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real-time. It should also be noted, the systems and/or methods described above may be applied to, or used in accordance with, other systems and/or methods.

What is claimed is:

1. A method for searching for a media asset comprising:
receiving, from a user input interface, using control circuitry, a first search query for a requested media asset based on a first input from a user;
querying, using communication circuitry, a content database for media assets related to the first search query;
receiving, using the communication circuitry, from the content database, in response to the first search query, identifiers of a first plurality of media assets identified by the content database as related to the first search query;
receiving, from the user input interface, using the control circuitry, a second search query for the requested media asset (i) based on a second input from the user and (ii) following the first search query;
querying, using the communication circuitry, the content database for media assets related to the second search query;
receiving, using the communication circuitry, from the content database, in response to the second search query, identifiers of a second plurality of media assets identified by the content database as related to the second search query;
based at least in part on determining that none of the first plurality of media assets match a media asset in the second plurality of media assets, providing, at the user input interface, using the control circuitry, a notification for the user to repeat the second search query;
receiving, from the user input interface, using the control circuitry, a third search query for the requested media asset;
determining, using the control circuitry, the third search query is related to the second search query based at least in part on determining, using the control circuitry, a first context identifier for the second search query is connected to a second context identifier for the third search query in a mapping of context identifiers;
based at least in part on determining the third search query is related to the second search query, querying, using the communication circuitry, the content database for media assets related to the third search query;
receiving, using the communication circuitry, from the content database, in response to the third search query, identifiers of a third plurality of media assets identified by the content database as related to the third search query;
determining, using the control circuitry, a media asset from the first plurality of media assets matches a media asset in the third plurality of media assets; and
generating for output, at the user input interface, a user selectable option comprising identifying information corresponding to the media asset from the first plurality of media assets that matches the media asset in the third plurality of media assets, wherein selection of the user selectable option causes output of the media asset.

2. The method of claim 1, further comprising determining whether a media asset from the first plurality of media assets matches a media asset in the second plurality of media assets by determining whether a third context identifier for the second search query exists in a mapping of context identifiers that includes a fourth context identifier for the first search query.

3. The method of claim 1, wherein the determining a media asset from the first plurality of media assets matches a media asset in the third plurality of media assets comprises determining a fifth context identifier for the third search query and a sixth context identifier for the first search query are connected in a mapping of context identifiers.

4. The method of claim 3, wherein the fifth context identifier is substantially similar to the third search query and the sixth context identifier is substantially similar to the first search query.

5. The method of claim 1, wherein the mapping of context identifiers that connects the first context identifier with the second context identifier is part of a knowledge graph.

6. The method of claim 5, wherein:
the knowledge graph comprises a plurality of nodes; and
the first context identifier and the second context identifier are mapped to different nodes of the plurality of nodes.

7. The method of claim 1, wherein the notification for the user to repeat the second search query includes an error message indicating that none of media assets relate to both the first search query and the second search query.

8. The method of claim 1, wherein the notification for the user to repeat the second search query includes identifying information corresponding to a media asset from the content database relating to the second search query but not relating to the first search query.

9. The method of claim 1, wherein at least one of the first search query, the second search query, or the third search query is received from an automated speech-to-text system.

10. The method of claim 1, further comprising:
determining, using the control circuitry, a subset of media assets from the first plurality of media assets matches a subset of media assets in the third plurality of media assets;
grouping media assets from the matching subsets of media assets by their type; and
generating for display the groupings of the media assets.

11. A system for searching for a media asset comprising:
a content database;
communication circuitry;
user input interface circuitry; and
control circuitry configured to:
receive, from the user input interface circuitry, a first search query for a requested media asset based on a first input from a user;
query, using the communication circuitry, the content database for media assets related to the first search query;
receive, using the communication circuitry, from the content database, in response to the first search query, a first plurality of media assets identified by the content database as related to the first search query;
receive, from the user input interface circuitry, a second search query for the requested media asset (i) based on a second input from the user and (ii) following the first search query;
query, suing the communication circuitry, the content database for media assets related to the second search query;
receive, using the communication circuitry, from the content database, in response to the second search query, a second plurality of media assets identified by the content database as related to the second search query;
based at least in part on determining that none of the first plurality of media assets match a media asset in the second plurality of media assets, provide, at the user input interface, a notification for the user to repeat the second search query;
receive, from the user input interface, a third search query for the requested media asset;
determine, using the control circuitry, the third search query is related to the second search query based at least in part on determining, using the control circuitry, a first context identifier for the second search query is connected to a second context identifier for the third search query in a mapping of context identifiers;
based at least in part on determining the third search query is related to the second search query, query, using the communication circuitry, the content database for media assets related to the third search query;
receive, using the communication circuitry, from the content database, in response to the third search query, a third plurality of media assets identified by the content database as related to the third search query;
determine a media asset from the first plurality of media assets matches a media asset in the third plurality of media assets; and
generate for output, at the user input interface, a user selectable option comprising identifying information corresponding to the media asset from the first plurality of media assets that matches the media asset in the third plurality of media assets, wherein selection of the user selectable option causes output of the media asset.

12. The system of claim 11, wherein the control circuitry is further configured to determine whether a media asset from the first plurality of media assets matches a media asset in the second plurality of media assets by determining whether a third context identifier for the second search query exists in a mapping of context identifiers that includes a fourth context identifier for the first search query.

13. The system of claim 11, wherein the control circuitry configured to determine a media asset from the first plurality of media assets matches a media asset in the third plurality of media assets comprises determining a fifth context identifier for the third search query and a sixth context identifier for the first search query are connected in a mapping of context identifiers.

14. The system of claim 13, wherein the fifth context identifier is substantially similar to the third search query and the sixth context identifier is substantially similar to the first search query.

15. The system of claim 11, wherein the mapping of context identifiers that connects the first context identifier with the second context identifier is part of a knowledge graph.

16. The system of claim 15, wherein:
the knowledge graph comprises a plurality of nodes; and
the first context identifier and the second context identifier are mapped to different nodes of the plurality of nodes.

17. The system of claim 11, wherein the notification for the user to repeat the second search query includes an error message indicating that none of media assets relate to both the first search query and the second search query.

18. The system of claim 11, wherein the notification for the user to repeat the second search query includes identifying information corresponding to a media asset from the content database relating to the second search query but not relating to the first search query.

19. The system of claim 11, wherein at least one of the first search query, the second search query, or the third search query is received from an automated speech-to-text system.

20. The system of claim 11, further comprising a display, wherein the control circuitry is further configured to:
- determine a subset of media assets from the first plurality of media assets matches a subset of media assets in the third plurality of media assets;
- group media assets from the matching subsets of media assets by their type; and
- generate for display, on the display, the groupings of the media assets.

\* \* \* \* \*